(12) United States Patent
Smethers

(10) Patent No.: US 6,463,304 B2
(45) Date of Patent: *Oct. 8, 2002

(54) APPLICATION LAUNCHER FOR A TWO-WAY MOBILE COMMUNICATIONS DEVICE

(75) Inventor: Paul A. Smethers, Cupertino, CA (US)

(73) Assignee: Openwave Systems Inc., Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,440

(22) Filed: Mar. 4, 1999

(65) Prior Publication Data

US 2002/0077156 A1 Jun. 20, 2002

(51) Int. Cl.[7] .................................................. H04B 1/38
(52) U.S. Cl. ........................ 455/566; 455/575; 345/810
(58) Field of Search ................................ 455/566, 550, 455/575; 379/368, 88.12; 345/348, 810, 835, 752, 169; 341/23; 340/7.52, 7.55, 7.56

(56) References Cited

U.S. PATENT DOCUMENTS

| | | |
|---|---|---|
| 4,617,657 A | 10/1986 | Drynan et al. |
| 5,199,104 A | 3/1993 | Hirayama |
| 5,425,077 A | 6/1995 | Tsoi |
| 5,481,539 A | 1/1996 | Hershey et al. |
| 5,559,512 A * | 9/1996 | Jasinski et al. ................ 341/22 |
| 5,692,032 A | 11/1997 | Seppänen et al. |
| 5,737,560 A | 4/1998 | Yohanan |
| 5,751,708 A | 5/1998 | Eng et al. |
| 5,761,280 A | 6/1998 | Noonen et al. |
| 5,797,098 A | 8/1998 | Schroeder et al. |
| 5,802,516 A | 9/1998 | Shwarts et al. |
| 5,809,415 A | 9/1998 | Rossmann |
| 5,848,356 A * | 12/1998 | Jambhekar et al. .......... 455/403 |
| 5,917,905 A * | 6/1999 | Whipple et al. ............. 379/356 |
| 5,987,336 A * | 11/1999 | Sudo et al. .................. 455/566 |
| 6,125,287 A * | 9/2000 | Cushman et al. ............ 455/566 |
| 6,144,863 A * | 11/2000 | Charron ....................... 455/566 |
| 6,332,024 B1 * | 12/2001 | Inoue et al. .............. 379/43.06 |

FOREIGN PATENT DOCUMENTS

| | | |
|---|---|---|
| EP | 0 633 684 A2 | 1/1995 |
| EP | 0 689 122 A1 | 12/1995 |
| EP | 0 844 553 A1 | 5/1998 |
| JP | 2001-331262 | * 11/2001 ............ 379/433.06 |

OTHER PUBLICATIONS

UP.Browser™ User Handbook, Unwired Planet, Inc., Nov. 1977.

"HDTP Specification", Version 1.1–Draft, Unwired Planet, Inc., Jul. 1997.

HDML 2.0 Language Reference, Version 2.0, Unwired Planet, Inc., Software Developer Kit, Jul. 1997.

"Wireless Application Protocol Architecture Specification" (WAP Architecture), Version 30, Apr. 1998.

* cited by examiner

Primary Examiner—DeWayne Bost
Assistant Examiner—Erika A. Gary
(74) Attorney, Agent, or Firm—Beyer Weaver & Thomas, LLP

(57) ABSTRACT

A method and apparatus for facilitating access to a plurality of applications resident on a two-way mobile communication device. Existing keys or buttons of the two-way mobile communication device activate (or launch) resident applications. Additionally, the two-way mobile communication device presents the user with a displayed map on its display screen to specifically indicate which keys or buttons keys launch which resident applications.

18 Claims, 9 Drawing Sheets

APPLICATION LAUNCHER FOR A TWO-WAY MOBILE COMMUNICATIONS DEVICE

BACKGROUND OF THE INVENTION

1. Field of the Invention

The present invention relates to two-way mobile communication devices and, more particularly, to an application launcher for two-way mobile communication devices.

2. Description of the Related Art

Slumping prices for static memory devices (e.g. SDRAMs and DRAMs) and microprocessors have made it possible for the manufactures of two-way mobile communication devices (e.g. two-way pagers, cellular phones, palm sized computing devices and personal digital assistants (PDAs)) to put more processing power and memory at the disposal of consumers, while at the same time pricing the units at a price which will allow them to obtain critical mass in the market place. The manufacturers of the two-way mobile communication devices and the associated service providers have developed numerous applications that provide devices with some functionality and features. The applications are typically scaled-down versions of like applications provided on personal computers (e.g., desktop and laptop computers). As a result, two-way mobile communication devices are able to include text editors, browsers, email applications, etc.

One problem is that as more and more applications are provided to these two-way mobile communication devices, which typically have limited size display screens and input keypads, is that it becomes more difficult for a user to activate a desired one of the applications. As a result, more user interaction and concentration is needed to properly activate the desired one of the applications.

User friendliness and functionality are important requirements for these devices to gain broad acceptance in the market place. For this to occur users have to be able to access and utilize the applications included in these two-way mobile communication devices with minimal effort and maximum efficiency. Conventionally, however, unsatisfactory amounts of user effort are required to access or activate applications provided on two-way mobile communication devices.

Thus, there is a need for a system and method which can present a plurality of applications resident on a two-way mobile communication device in a manner that enables a user to easily and quickly select and activate a desired application.

SUMMARY OF THE INVENTION

The present invention relates to a method and apparatus for facilitating access to a plurality of applications resident on a two-way mobile communication device. More specifically, the present invention makes use of existing keys or buttons on a two-way mobile communication device to activate (or launch) resident applications. Additionally, the two-way mobile communication device presents the user with a map displayed on its display screen to specifically indicate which keys or buttons keys launch which resident applications.

The invention can be implemented in numerous ways, including as a method, an apparatus, a system, and a computer readable medium. Several embodiments of the invention are discussed below.

According to one embodiment, a method of initiating one of a plurality of resident applications in a two-way mobile communication device having a display and an input interface includes the operations of: displaying a key map on the display of the two-way mobile communication device, the key map including symbolic identifiers for a group of the resident applications, and each of the symbolic identifiers provide information relating to the assignment of a key of a group of keys of the two-way mobile communication device; receiving a selection of the keys in the group of keys; and executing one of the resident applications within the group of the resident applications that is associated with the selected one of the keys in the group of keys.

According to another embodiment, a method of initiating a selected one a plurality of resident applications in a two-way mobile communication device having a display and a keypad includes the operations of: displaying a key map on the display of the two-way mobile communication device, the key map providing graphical indicators for at least a set of resident applications; associating a set of the keys of the keypad with the graphical indicators of the key map; and executing the associated one of the resident applications in the set of resident applications when one of the set of the keys of the keypad is actuated.

As a two-way mobile communication device, an embodiment of the invention includes: a display screen; an input user interface that allows a user to input a selection, the input user interface including keys; a processor for executing at least one of a plurality of resident applications; and a memory that stores the resident applications and further stores program code to enable a user to facilitate easy user selection of one of the resident applications to activate. The program code includes: program code for displaying a key map on the display of the two-way mobile communication device, the key map including symbolic identifiers for a group of the resident applications, and each of the symbolic identifiers are assigned to a key of a group of keys of the two-way mobile communication device and are arranged in a configuration corresponding to the group of keys of the two-way mobile communication device; program code for receiving a selection of the keys in the group of keys; and program code for activating one of the resident applications within the group of the resident applications that is associated with the selected one of the keys in the group of keys.

The advantages of the invention are numerous. Different embodiments or implementations may yield one or more of the following advantages. One advantage of the invention is that applications resident on two-way mobile communication devices can be launched or activated with reduced user effort. Another advantage of the invention is that a resident application to be launched can be rapidly selected.

Other aspects and advantages of the invention will become apparent from the following detailed description taken in conjunction with the accompanying drawings, which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to methods and apparatuses that enable a two-way mobile communication device to easily and efficiently activate (or launch) resident applications by pressing assigned keys (or buttons) on a keypad of the two-way mobile communication device.

Two-way mobile communication devices, also referred to as two-way interactive communication devices, wireless client devices or mobile devices, include but are not limited to personal digital assistant (PDA) like devices, cellular phones, or wireless capable remote controllers. Such devices typically have significantly less memory and processing capability than is found in desktop and laptop computers. These two-way mobile communication devices typically have a small display screen and a keypad as opposed to the keyboards and display screens associated with desktop or laptop computers. The invention is envisioned for use with two-way mobile communication devices with the capability to display image maps on the local display apparatus (e.g., Liquid Crystal Display (LCD) screen).

In the following detailed description of the invention, numerous specific details are set forth in order to provide a thorough understanding of the present invention. However, it will become obvious to those skilled in the art that the invention may be practiced without these specific details. In other instances, well known methods, procedures, components, and circuitry have not been described in detail to avoid unnecessarily obscuring aspects of the invention.

Embodiments of the invention are discussed below with reference to FIGS. 1–7. However, those skilled in the art will readily appreciate that the detailed description given herein with respect to these figures is for explanatory purposes as the invention extends beyond these limited embodiments.

Figure 1:
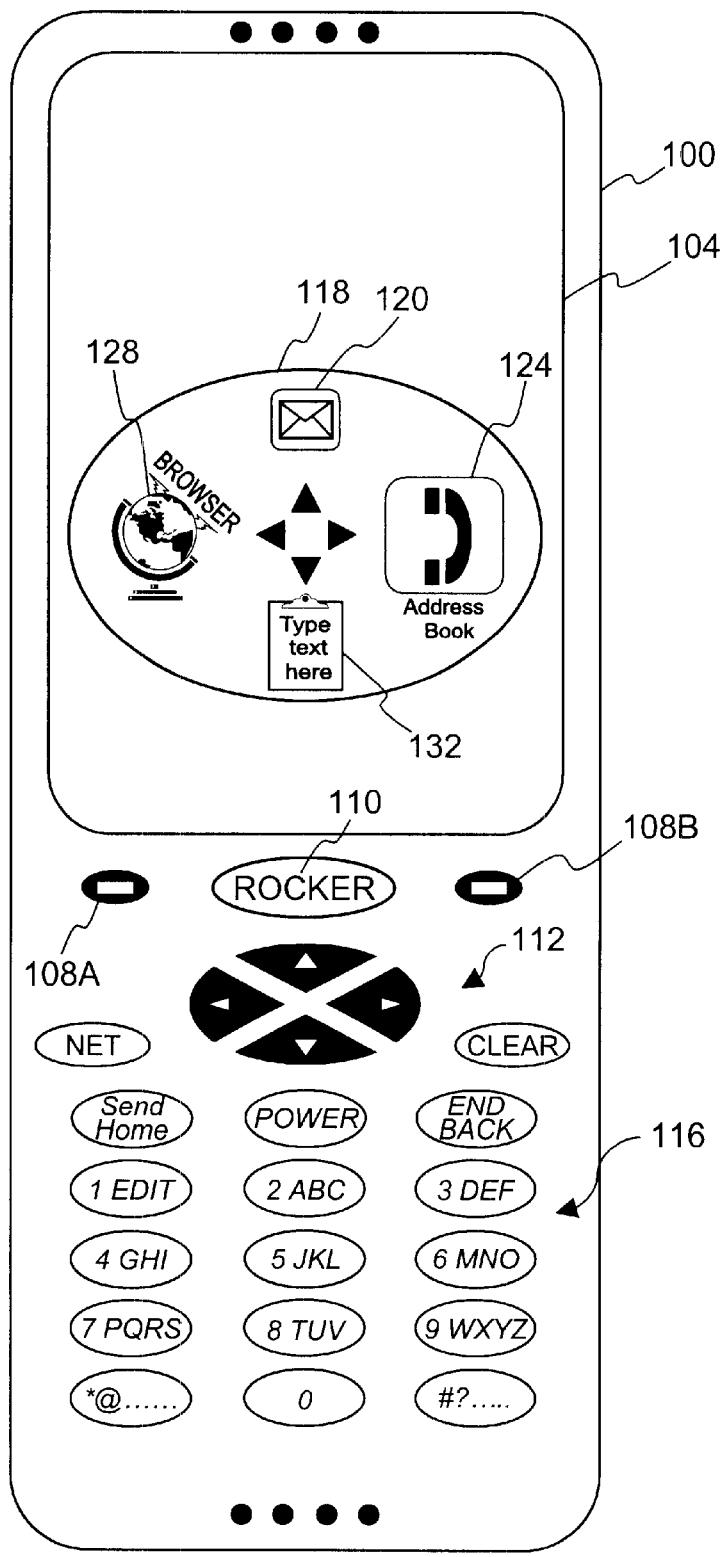
FIG. 1 illustrates a schematic of a two-way mobile communication device according to an embodiment of the present invention.

FIG. 1 is a diagram of a two-way mobile communication device 100 (also referred to as a mobile device herein) according to one embodiment of the invention. The two-way mobile communication device 100 communicates with remote entities through a wireless network (not shown). Examples of commonly used wireless networks include Cellular Digital Packet Data (CDPD), Global System for Mobile Communications (GSM), Code Division Multiple Access (CDMA) and Time Division Multiple Access (TDMA), to name a few.

Mobile device 100 includes an enhanced display screen 104 capable of displaying an image map 118, soft keys 108A and 108B, navigation key group 112, and a phone keypad 116. The typical phone keypad, as commonly seen, comprises twelve buttons. Of the twelve buttons, ten buttons are consecutively numbered "0" to "9", one button is for "*" sign and the other button is for "#" sign. Additionally, mobile device 100 may contain extra buttons which provide added convenience and functionality. In this embodiment, the extra buttons include a ROCKER button 110 and various miscellaneous keys, including NET, CLEAR, Send/Home, Power, and End/Back. The functionality of ROCKER button 110 is described in detail below, and the functionality of the miscellaneous are well known in the art. ROCKER button 110, soft keys 108A and 108B, navigation key group 112 and phone keypad 116 provide a convenient and efficient means for a user to interact with mobile device 100. Further, it is to be understood by those of ordinary skill in the art that the present invention may be practiced using other types of input interfaces (e.g., softkeys, iconic screens) and keypad configurations.

As used herein, a display screen is the physical display apparatus of a two-way mobile communication device. As an example, the display screen can be a Liquid Crystal Display (LCD) screen. A screen display is an image presented or displayed on the display screen.

Image map 118 is comprised of a plurality of graphical symbols which identify the applications to which the various navigation keys of navigation key group 112 are assigned. In this implementation, image map 118 is displayed on the display screen 104 such that the graphical symbols are arranged in a graphical representation that corresponds to that of navigation key group 112. The navigation key group 112 includes a 12 o'clock navigation key, a 3 o'clock navigation key, a 6 o'clock navigation key, and a 9 o'clock navigation key. As such, in this implementation, the graphical symbols include an envelope symbol 120, a phone symbol 124, a notepad symbol 132, and a browser symbol 128. The envelope symbol 120 indicates that the 12 o'clock navigation key launches an email program. Phone symbol 124 indicates the 3 o'clock navigation key launches an address book application. Notepad symbol 132 indicates that the 6 o'clock navigation key launches a notebook application. Browser symbol 128 indicates that the 9 o'clock navigation key launches a browser for mobile device 100. The browser is a network browser, such as a HTML browser or a HDML browser. The graphical symbols can, for example, be provided as bitmaps, JPEG images, or GIF images.

Figure 2:
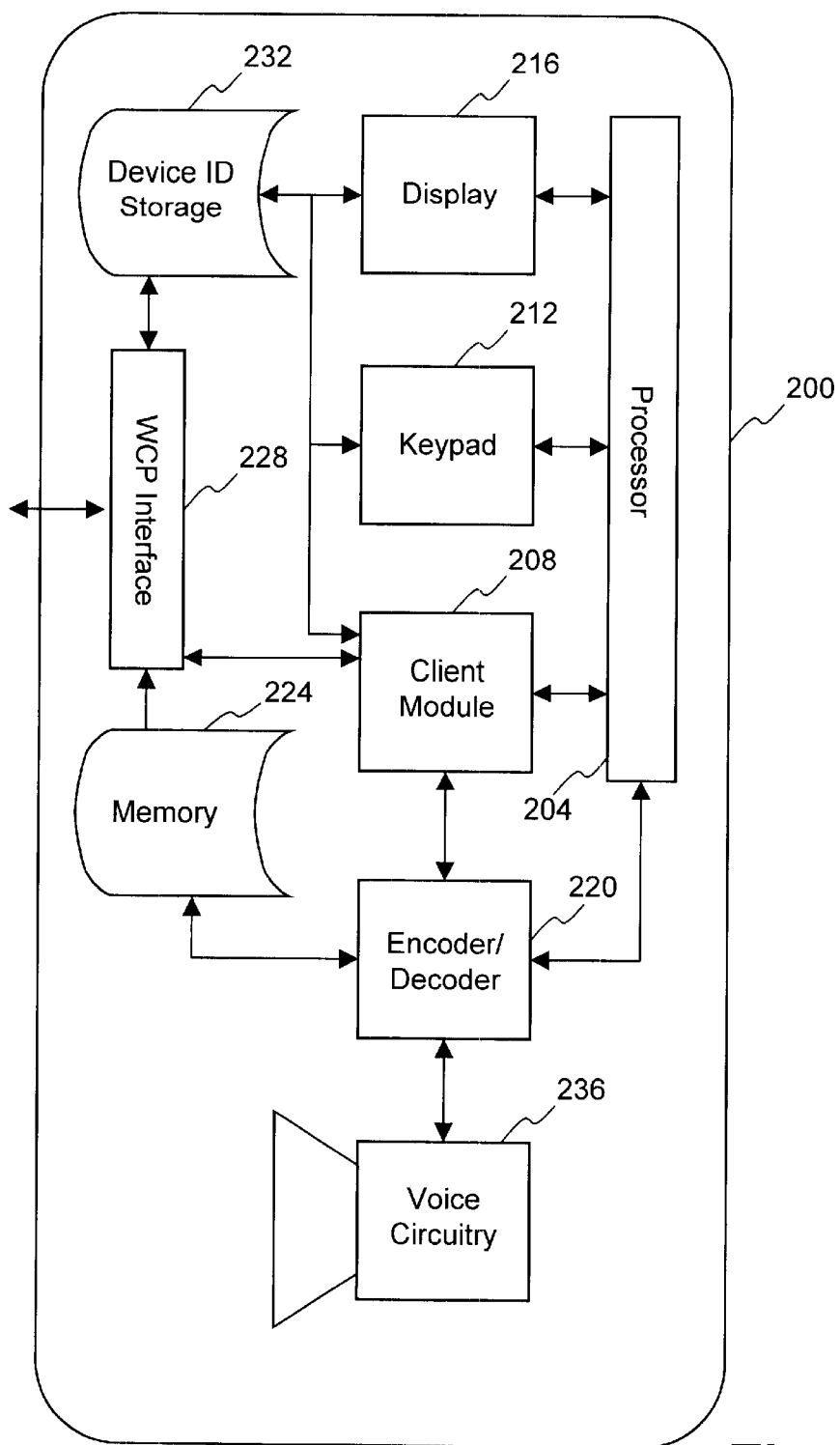
FIG. 2 illustrates a functional block diagram of the two-way mobile communication device according to an embodiment of the present invention.

FIG. 2 is a functional block diagram of a two-way mobile communication device 200 (also referred to as a mobile device herein) according to one embodiment of the invention. Mobile device 200 is, for example, suitable for use as the two-way mobile communication device 100 of FIG. 1.

Mobile device 200 includes a client module 208 which works in conjunction with processor 204 and working memory 224 to perform the processing tasks performed by mobile device 200. These processing tasks include operation of the various applications resident on mobile device 200, management of communication processing, and management of keypad input. More particularly, with respect to the activation of one of the resident applications, the processing tasks include displaying an image map on the display screen (e.g., image map 118 of FIG. 1), receiving a selection of one of the resident applications using the keys in the navigation key group (e.g., navigation key group 112 of FIG. 1), and activating the selected resident application.

One of ordinary skill in the art will appreciate that the navigation key assignments and the image maps may also be pre-programmed and loaded with the software for mobile device 200, or determined dynamically when the image map is to be displayed. Regardless, the image map can be user customizable. For example, in the case where the image map is determined dynamically, the processing may operate to 1)

identify executable files for the resident applications; 2) associate the identified executable files with the keys in the navigation key group (e.g., navigation key group 112 of FIG. 1); 3) generate an image map (e.g., 118 of FIG. 1) which provides an indication as to which applications are assigned to which navigation keys; and 4) displaying the generated image map on the display screen (e.g., 104 of FIG. 1).

Mobile device 200 further includes a Wireless Control Protocol (WCP) interface 228 that couples to a wireless network via a RF transceiver (not shown) to receive incoming and outgoing data signals. Device identifier (ID) storage 232 supplies a device ID to WCP interface 228. The device ID identifies a specific code that is associated with mobile device 200. As an example, the mobile device 200 can couple to a proxy server (not shown) through the wireless network where the device ID is used to locate a subscriber (user) account provided in the proxy server, and then the proxy server couples to a network such as the Internet.

In addition, mobile device 200 includes a display screen 216 for displaying information, and receiving user input from a user via a keypad controlled by keypad circuit 212. Additionally, the client module 212 operates, among other things, a browser, commonly referred to as micro-browser, requiring much less computing power and memory than well-known HTML browsers do. Additional details on accessing a (proxy) server device from a mobile device using a (micro) browser is described in U.S. Pat. No. 5,809,415 which is hereby incorporated by reference in its entirety.

Mobile device 200 also includes the voice circuitry 236 (e.g., a speaker and a microphone) and the associated hardware (e.g., encoder/decoder 220, processor 204 and keypad circuitry 224) which allows it to switch to a telephone mode of operation which is separate and distinct from a network (data) mode of operation.

According to one embodiment of the present invention, a user wishing to access a particular application only has to press (actuate) the assigned navigation key in the navigation key group. An image map (e.g. a bitmap) providing an indication of the relationship between the resident applications and the navigation key assignments is displayed on the display screen of the two-way mobile communication device when the device is first powered up or when a pre-defined key (e.g., ROCKER 110 of FIG. 1) is pressed. Additionally, the navigation keys may be re-assigned or re-ordered by actuating one or more pre-defined keys (e.g., ROCKER 110 of FIG. 1).

Representative operation of mobile device 100 is now described for activation of a resident application. In operation, a user (not shown) utilizing mobile device 100 of FIG. 1, starting with the device off, turns mobile device 100 on by pressing the power-on button. Upon powering up, image map 118 is displayed on display screen 104. This initial mode of operation is referred to as a launch pad. Image map 118 provides an indication as to which resident applications are assigned to which navigation keys in navigation key group 112. The navigation key in the six o'clock position is assigned to a notepad application as indicated by symbol 132. Pressing the navigation key in the six o'clock position causes mobile device 100 to enter a notepad mode of operation.

Figure 3A:
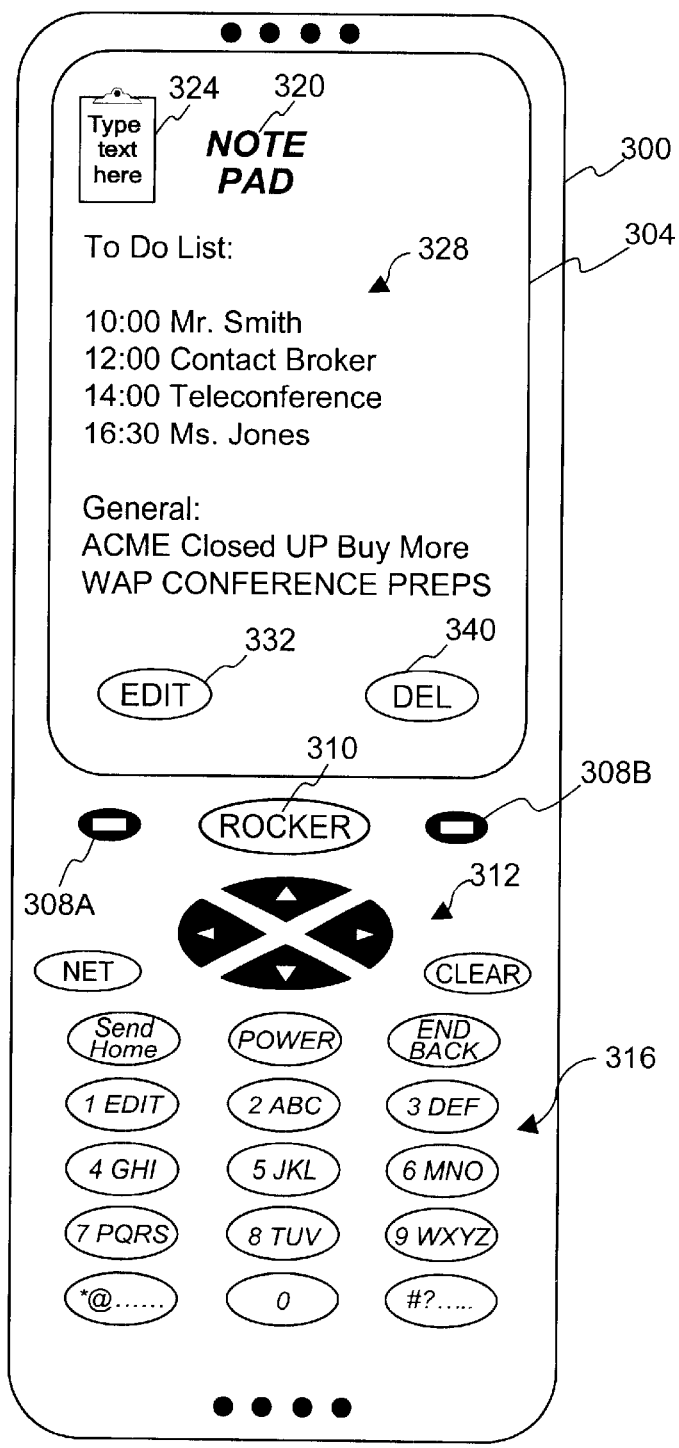
FIGS. 3A–3C illustrate schematics of the display of a two-way mobile communication device after accessing an application according to embodiments of the present invention.

FIG. 3A illustrates a user interface for a notepad mode of operation according to one representative embodiment. The notepad mode of operation is provided by execution of the notepad application.

In the notepad mode of operation, the user interface provided on the display screen 304 of mobile device 300 is designed for efficient use with the notepad application, such as entering of data. The information displayed on display screen 304 includes symbol 324 referencing a notepad graphic image (e.g., icon or bitmap), application title 320 (i.e., NOTEPAD), previously entered data 328, and soft key function indicators 332 and 340 for indicating the functions associated with soft keys 308A and 308B. To get to this point, the user had only to perform two single key input transactions, namely pressing the power button to turnon the unit and pressing the navigation key to launch the notepad application. Hence, with the invention, a user is able to efficiently launch the notepad mode of operation. Previously, a user had to turn the device on, navigate to the menu listing the resident applications, scroll through the list of applications and enter a selection.

Whenever ROCKER key 310 is pressed, mobile device 300 returns to the launch pad mode of operation as shown in FIG. 1. In this mode of operation the original navigation key image map 118 is displayed on display screen 104 and the functionality of the navigation keys in navigation key group 112, soft keys 108A and 108B, and keypad 116 are restored to their original state.

Pressing the navigation key in the nine o'clock position causes mobile device 100 to enter a browser mode of operation. Pressing the navigation key in the three o'clock position causes mobile device 100 to enter an address book mode of operation. Pressing the navigation key in the twelve o'clock position causes mobile device 100 to enter an electronic mail (E-Mail) mode of operation.

Figure 3B:
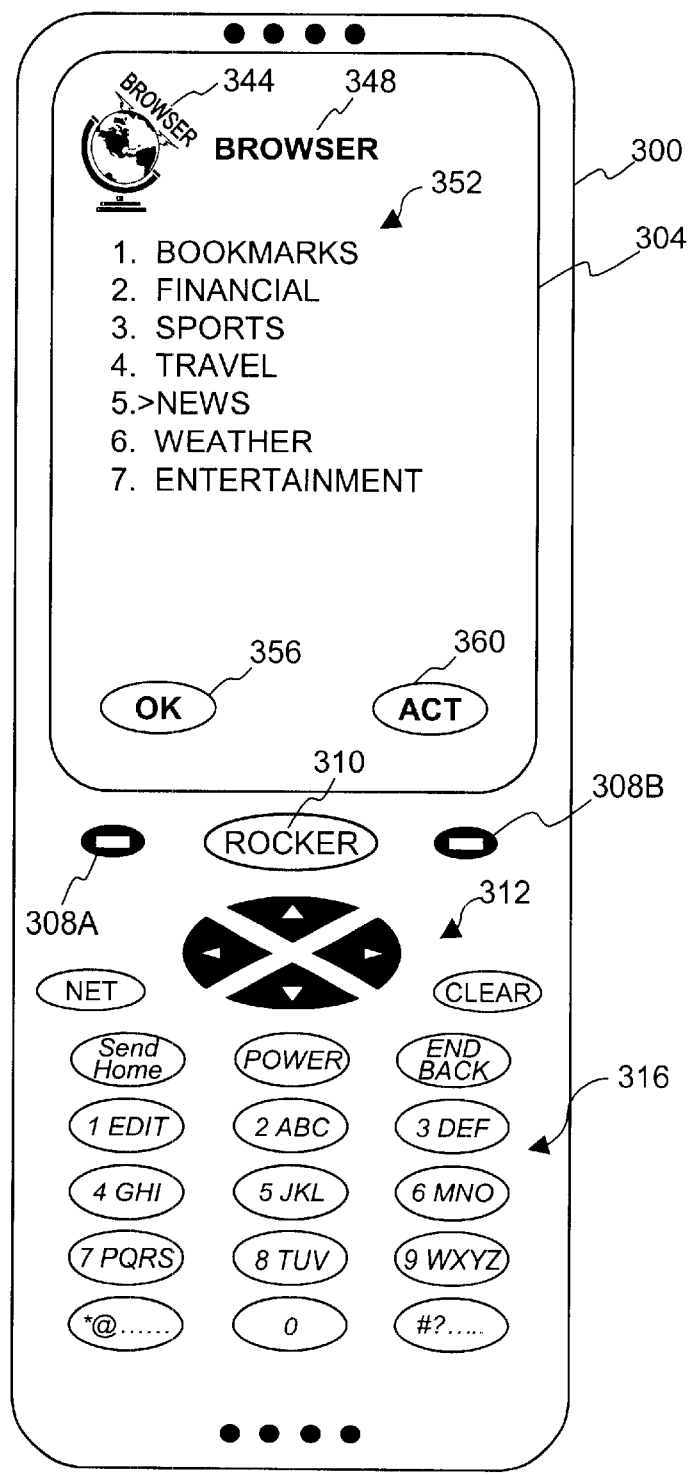

FIG. 3B illustrates a user interface for a browser mode of operation according to one representative embodiment. The browser mode of operation is provided by execution of the browser application.

In the browser mode of operation, the user interface provided on the display screen 304 of mobile device 300 is designed for efficient use with the browser application, such selecting a content channel or entering a network address (e.g., Universal Resource Locator). The information displayed on display screen 304 includes symbol 344 referencing a network graphic image (e.g., icon or bitmap), application title 348 (i.e., BROWSER), a list 352 of available content channels, and soft key function indicators 356 and 360 for indicating the functions associated with soft keys 308A and 308B. To reach this point, the user only had to perform two single key input transactions, namely pressing the power button to turn-on the unit (if not already on) and pressing the navigation key to launch the browser application. Hence, a user is able to efficiently launch the browser mode of operation.

Figure 3C:
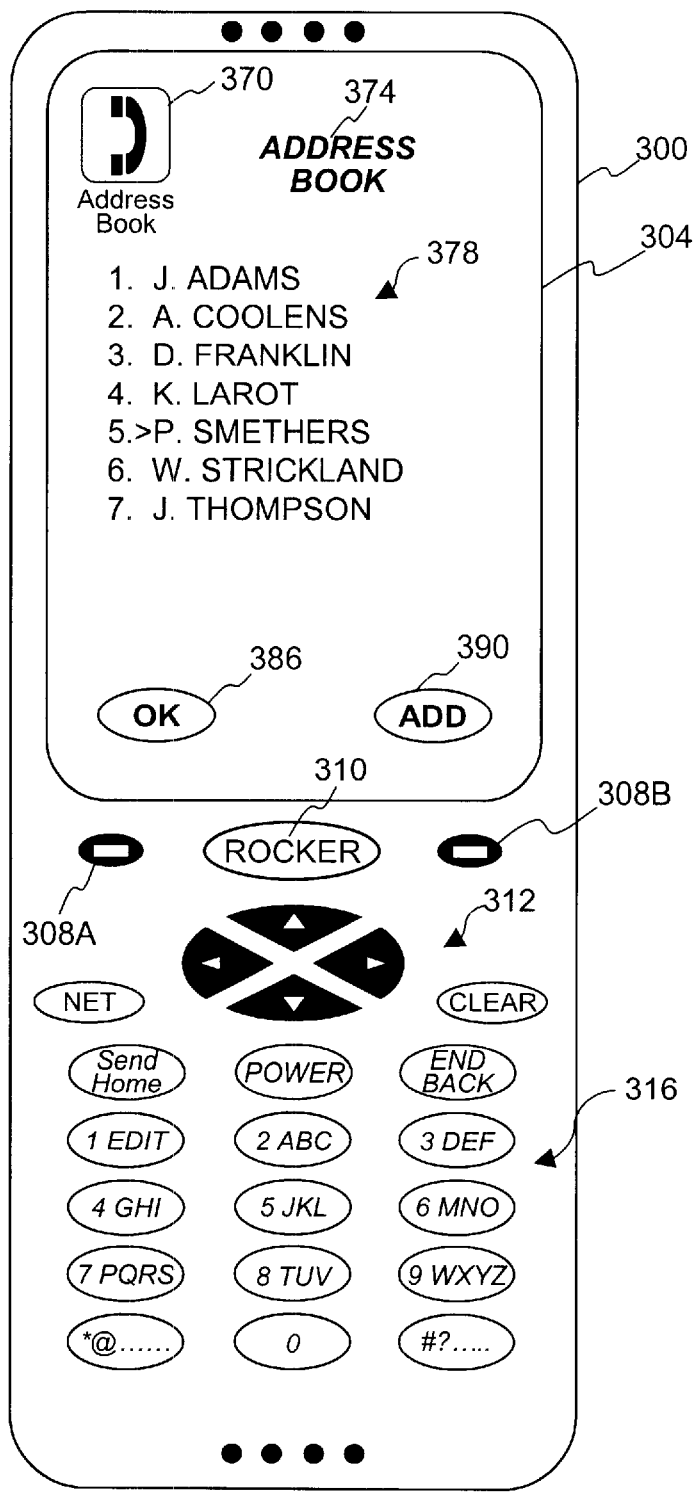

FIG. 3C illustrates a user interface for an address book mode of operation according to one representative embodiment. The address book mode of operation is provided by execution of the address book application.

In the address book mode of operation, the user interface provided on the display screen 304 of mobile device 300 is designed for efficient use with the address book application, such selecting a person from the address book. The information displayed on display screen 304 includes symbol 370 referencing a telephone graphic image (e.g., icon or bitmap), application title 348 (i.e., ADDRESS BOOK), a list 378 of available content channels, and soft key function indicators 386 and 390 for indicating the functions associated with soft keys 308A and 308B. To reach this point, the user only had to perform two single key input transactions, namely pressing the power button to turn-on the unit (if not already on) and pressing the navigation key to launch the address book application. Hence, a user is able to efficiently launch the address book mode of operation.

Figure 4:
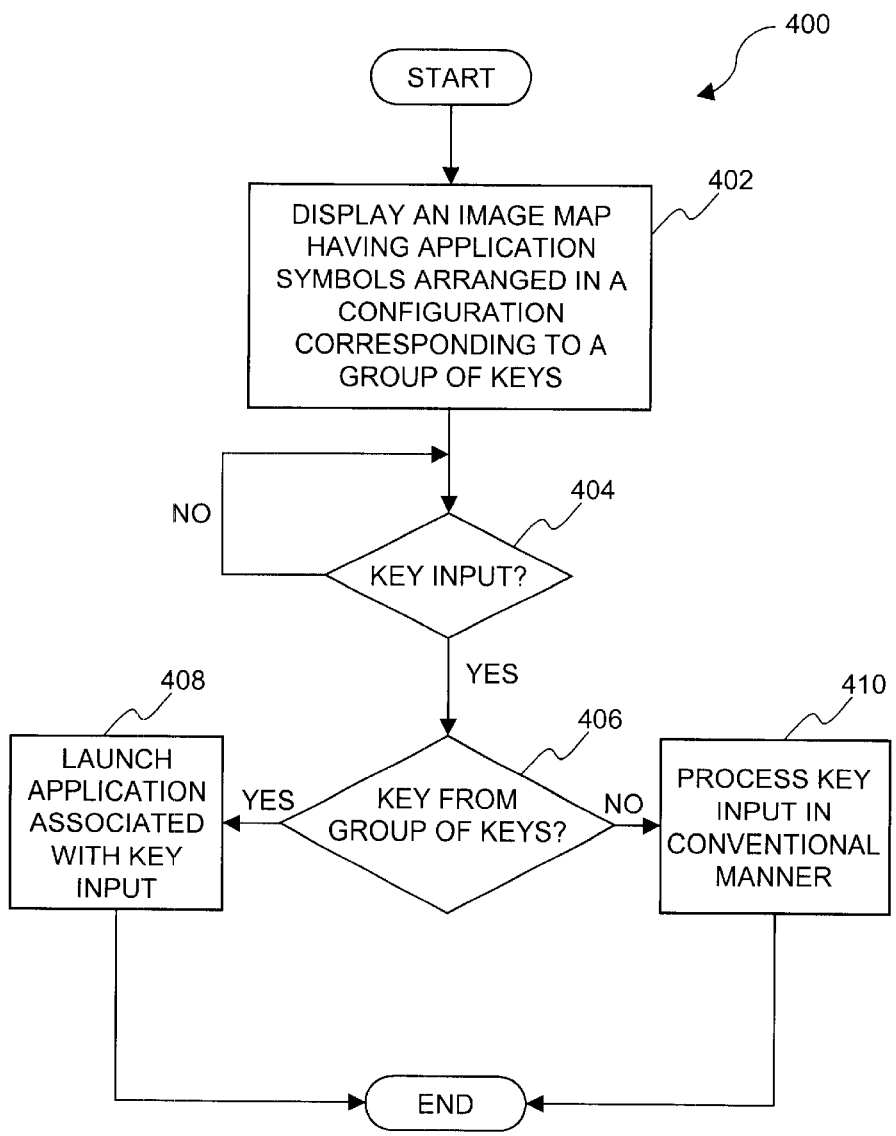
FIG. 4 is a flowchart of a application launch process according to one embodiment of the invention.

FIG. 4 is a flowchart of a application launch process 400 according to one embodiment of the invention. A mobile device having a keypad and a display screen performs the application launch process 400. For example, the mobile is the mobile device 100 illustrated in FIG. 1.

The application launch process 400 initially displays an image map on a display screen (e.g., display screen 104 illustrated in FIG. 1) at block 402. The image map being displayed corresponds to an arrangement of a group of keys. The image map serves to associate resident applications to the keys in the arrangement of the group of keys. The arrangements can type a wide variety of shapes and configurations, and the types of keys being associated can also vary widely. For example, as shown in the representative embodiment in FIG. 1, the image map 118 associates the group of navigation keys 112 with resident applications identified by graphical symbols 120, 124, 128 and 132.

Next, at decision block 404, a determination of whether a key input has been made. If a key input has not been be made, the application launch process 400 awaits the entry of a key. Once a key input has been made, the application launch process 400 continues.

When the application launch process 400 continues, a decision block 406 determines whether the key that has been entered is from the group of keys. If the key is determined to be from the group of keys, the application associated with the key input is launched at block 406. On the other hand, when the key is determined not to be from the group of keys, the key that has been entered is processed in a conventional manner. Following blocks 408 and 410, the application launch process 400 is complete and ends.

Figure 5:
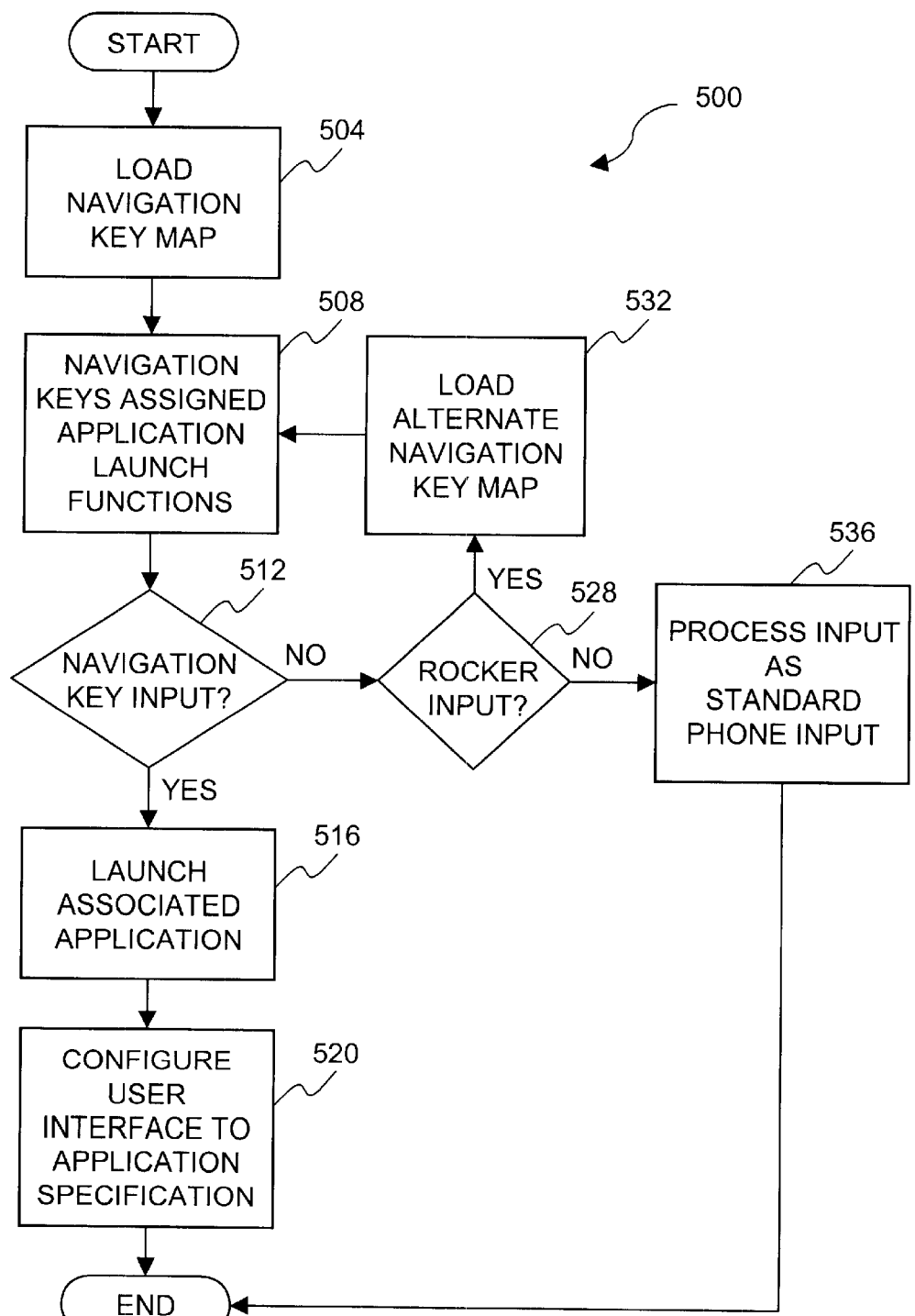
FIG. 5 illustrates a flowchart for an application launch process according to one embodiment of the present invention in which a navigation key map and navigation key assignments are pre-assigned.

FIG. 5 illustrates a flowchart for an application launch process 500 according to one embodiment of the present invention in which a navigation key map and navigation key assignments are pre-assigned. In this embodiment a plurality of applications are typically loaded as a package with a predefined navigation map and key assignments to activate the applications.

At 504 the navigation map (e.g., image map 118 of FIG. 1) is loaded and displayed on the display screen of the two-way mobile communication device. At 508 the navigation keys are assigned application launch functions. At 512, a determination is made as to whether a navigation key has been input.

When the determination at 512 determines that a navigation key has been input (i.e., one of the assigned navigation key has been pressed), the associated application is launched 516. Once the associated application is launched, an application interface screen (e.g. display screen 304 of FIG. 3A) of the two-way mobile communication device is configured in an application specific mode.

Utilizing the present invention, a user desirous of selecting and accessing a resident application on a mobile device, may do so by pressing one of the assigned navigation keys once the device is powered on. This represents a significant contribution to the user friendliness of mobile devices as these device are often used in circumstances where the user is limited to operating the mobile device with a single hand or can not dedicate their full attention to finding the application they desire. For example, a user attempting to look-up an address in an ADDRESS book application while busy driving an automobile is able to easily access the ADDRESS book application by pressing an assigned navigation key. The navigation keys themselves are generally presented in a prominent position on the mobile device so they are easy to find even in poorly lighted environments. Also, a readily visible image map is presented on the display screen to provide the user a clear indication as to the identity of the resident applications and the assigned navigation keys.

As the capabilities of mobile devices and the number of applications available to users on these platforms grow, there is a distinct possibility that the number of applications resident on the mobile device may exceed the number of keys in the group of keys (e.g., navigation keys). In this event, there is a need to re-use the available navigation keys. To this end, multiple launch pads may be programmed into the mobile device. Each of the launch pads could have its own image map and corresponding navigation key group assignments. Referring again to FIG. 5, a user desiring to launch a resident application not currently displayed on the image currently displayed on the display screen presses a pre-assigned key 528 (e.g., the ROCKER key). By pressing the pre-assigned key 528, a different image map with the desired application is displayed 532 and the corresponding re-assignment of the navigation keys 508 is accomplished. Each time the pre-assigned key 528 is pressed, a different launch pad is presented representing a different set of resident applications. The launch pads can then eventually repeat. The process then proceeds as previously described. On the other hand, if a key other than a navigation key or the ROCKER key is pressed then that input is processed as a standard input 536 (e.g., a phone number).

It is important to note at this point that any button on the keypad of the two-way mobile communication device may serve as the pre-assigned key 528, and thus be assigned the functions of the ROCKER key. There is no requirement to have a separate key designated for this function.

Besides pre-loading applications and image maps with key assignments, a utility application can be provided or made available to a mobile device to perform various installation functions. Examples of installation functions include: 1) identifying resident applications; 2) making (or changing) the necessary key assignments, and 3) generating a corresponding navigation key group image map. The graphical symbols utilized to represent the various applications can be provided with the applications, obtained from a remote source, selected from generic symbols provided with the utility application. This type of system gives users the capability to tailor their mobile devices to meet their individual needs in much the same fashion that users of personal computers select the software they desire and have a graphical representation of the selected software presented to them upon installation.

Figure 6:
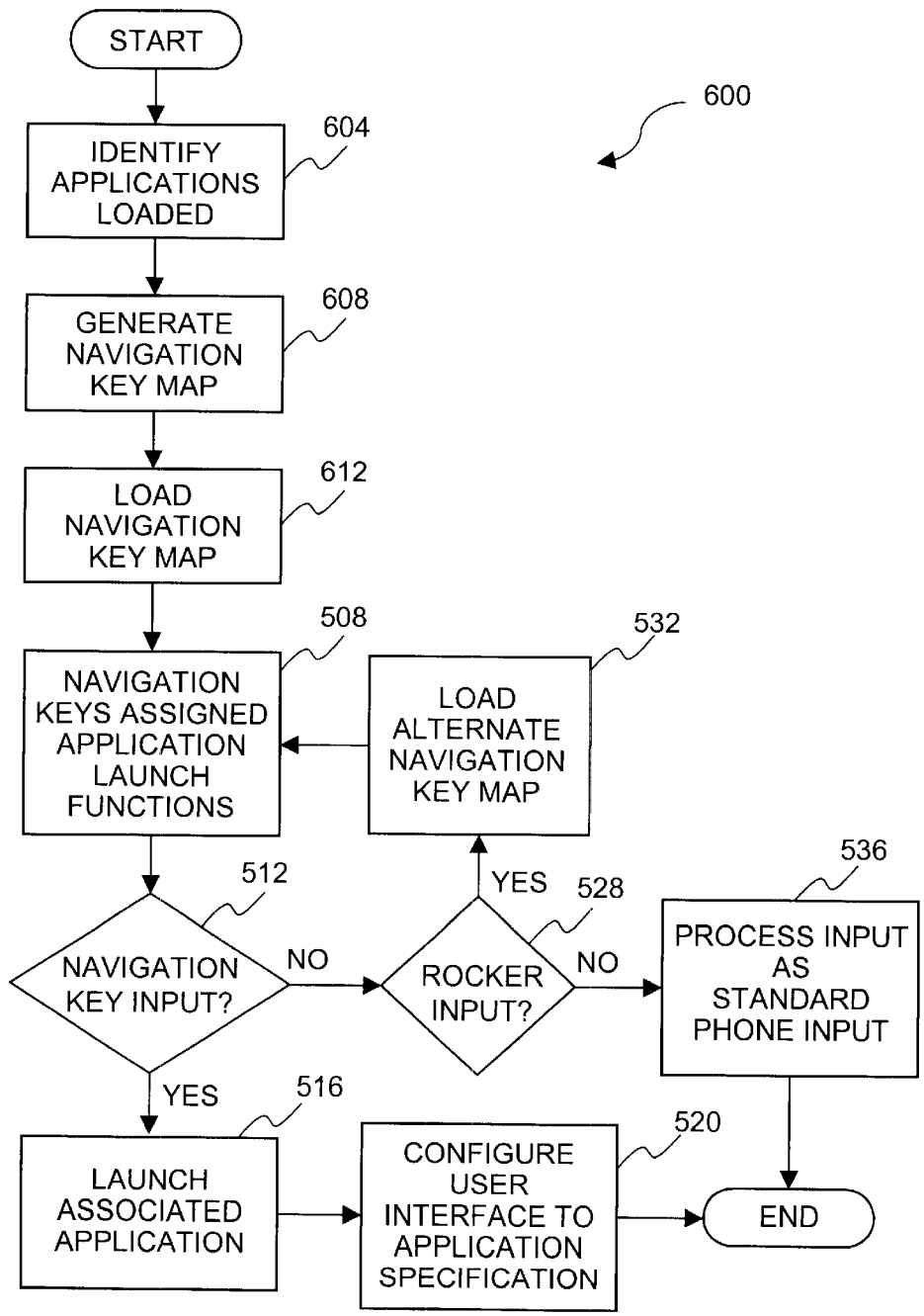
FIG. 6 illustrates a flowchart for an application launch process according to another embodiment of the present invention in which a navigation key map and navigation key assignments are not pre-assigned.

FIG. 6 illustrates a flowchart for an application launch process 600 according to another embodiment of the present invention in which a navigation key map and navigation key assignments are not pre-assigned. In this embodiment, the applications are loaded individually with supplemental applications whose function is to identify the resident application and to generate the navigation key map and associated symbols as well as the key assignments.

At 604 applications loaded on the mobile device are identified. Then, a navigation key map is generated at 608 based on the identified applications. At 612 the generated navigation key map (image map 118 of FIG. 1) is loaded and displayed on the display screen of the mobile device. Thereafter, the an application launch process 600 resembles the an application launch process 500 of FIG. 1.

As an example, the application launch process 600 can be performed each time a change is detected in a system registry or table which identifies the resident applications on the mobile device. For example, the application launch process 600 can be used whenever a new application is installed on the mobile device or a registry (or table) listing all the installed applications is updated. Once the application launch process 600 is complete, the applications resident on the mobile device can be launched from a launch pad according to the invention.

Figure 7:
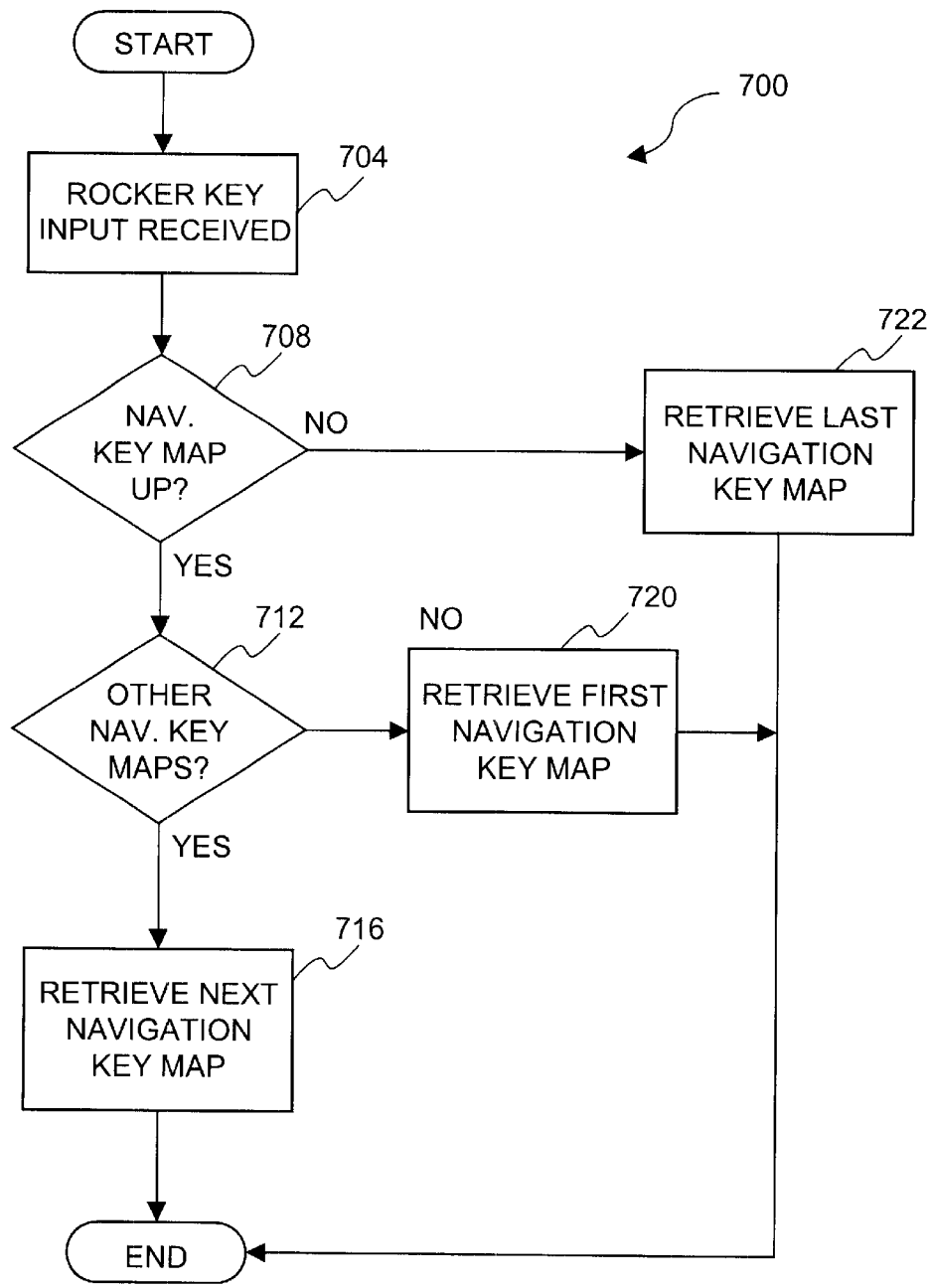
FIG. 7 illustrates a flowchart of a next image map process according to an embodiment of the invention.

FIG. 7 illustrates a flowchart of a next image map process 700 according to an embodiment of the invention. The next image map process 700 is performed when the pre-assigned key is pressed. In this embodiment, the pre-assigned key is the ROCKER key. As previously stated, any key or soft key on the user interface of the mobile device can function as the ROCKER key, and there is no requirement for a dedicated ROCKER key. At 704 the ROCKER key input is received. Next, at 708 a determination is made as to whether the mobile device has a navigation key map being displayed (i.e., the mobile device is in the launch pad mode). If a navigation key map is displayed, then a determination is made 712 as to whether there are additional navigation key maps available. If there are additional navigation key maps available, then at 716 the next available navigation key map is retrieved and displayed. While if there are no additional navigation key maps available, then at 720 the first available navigation map is retrieved and displayed. Each time a different navigation key map is displayed, the reassignment of the navigation keys to the applications within the navigation key map occurs. On the other hand, if a navigation key map is not being displayed (i.e., the mobile device not in the launch pad mode), then pressing the ROCKER key causes the mobile device to return to the launch pad mode and display the navigation key map that was last displayed (back to the launch pad) at 722.

The advantages of the invention are numerous. Different embodiments or implementations may yield one or more of the following advantages. One advantage of the invention is that applications resident on two-way mobile communication devices can be launched or activated with reduced user effort. Another advantage of the invention is that a resident application to be launched can be rapidly selected.

The present invention has been described in sufficient detail with a certain degree of particularity. It is understood to those skilled in the art that the present disclosure of embodiments has been made by way of example only and that numerous changes in the arrangement and combination of parts as well as operations may be resorted without departing from the spirit and scope of the invention as claimed. Accordingly, the scope of the present invention is defined by the appended claims rather than the forgoing description of embodiments.

What is claimed is:

1. In a two-way mobile communication device having a display and an input interface, a method of initiating one of a plurality of resident applications, said method comprising:

displaying a key map on said display of the two-way mobile communication device, the key map including graphical symbolic identifiers for a group of the resident application programs, each of said graphical symbolic identifiers are distinct and represent a corresponding one of the resident application programs, and each of said graphical symbolic identifiers provide information relating to the assignment of a key of a group of keys of the two-way mobile communication device;

receiving a selection of the keys in the group of keys; and executing one of the resident applications within the group of the resident applications that is associated with the selected one of the keys in the group of keys, wherein the arrangement of the graphical symbolic identifiers within the key map corresponds to an arrangement of the keys in the group of keys, wherein the keys in the group of keys are navigation keys for the two-way mobile communication device and are arranged in a circular pattern, and wherein the arrangement of the graphical symbolic identifiers is circular with a like configuration as the navigation keys in the circular pattern, and wherein at least two of the resident application programs within the group of resident application programs are chosen from the group of: email application, address book application, notepad application, and network browser application.

2. A method as recited in claim 1, wherein said graphical symbolic identifiers are icons.

3. A method as recited in claim 1, wherein the keys in the group of keys are non-alpha-numeric keys, and wherein said non-alpha-numeric input elements are resident on a phone-style keypad.

4. A method as recited in claim 3, wherein said non-alpha-numeric input elements are cursor navigation keys.

5. A method as recited in claim 1, wherein the keys in the group of keys are soft keys of a user screen input interface.

6. A method as recited in claim 1, wherein said method further comprises:

replacing the key map with an alternative key map when a predefined key input is received;

providing symbolic identifiers in the alternate key map for another group of the resident applications, and each of said graphical symbolic identifiers provide information relating to the assignment of a key of the groups of keys of the two-way mobile communication device; and placing said graphical symbolic identifiers for the another group of the resident applications on the alternate key map, each of said graphical symbolic identifiers provides information relating to the assignment of a key of the groups of keys of the two-way mobile communication device.

7. A method as recited in claim 6, wherein the key map is a navigation key map, and the alternative key map is an alternative navigation key map.

8. A method as recited in claim 1, wherein the input interface is a keypad, and wherein the two-way mobile communication device is selected from the group of: personal digital assistant (PDA), cellular phone, pager, or wireless remote controller.

9. In a two-way mobile communication device having a display and a keypad, a method of initiating a selected one a plurality of resident applications, said method comprising:

displaying a key map on the display of the two-way mobile communication device, the key map providing graphical indicators for at least a set of resident application programs;

associating a set of the keys of the keypad with the graphical indicators of the key map; and executing the associated one of the resident application programs in the set of resident application programs when one of the set of the keys of the keypad is actuated, and wherein the keys in the set of keys are navigation keys for the two-way mobile communication device and are arranged in a circular pattern, and wherein the arrangement of the graphical indicators is circular with a like configuration as the navigation keys in the circular pattern, and wherein at least two of the resident application programs within the set of resident application programs are chosen from the group of: email application, address book application, notepad application, and network browser application.

10. A method as recited in claim 9, wherein the two-way mobile communication device is selected from the group of: personal digital assistant (PDA), cellular phone, pager, or wireless remote controller.

11. A method as recited in claim 9, wherein the keys in the set of keys are soft keys.

12. A method as recited in claim 9, wherein the arrangement of the symbolic identifiers within the key map corresponds to an arrangement of the keys in the set of keys.

13. A method as recited in claim 9, wherein said method further comprises:

replacing the key map with an alternative key map when a predefined key input is received;

providing symbolic identifiers in the alternate key map for another group of the resident applications, and each of said symbolic identifiers provide information relating to the assignment of a key of the groups of keys of the two-way mobile communication device; and placing said symbolic identifiers for the another group of the resident applications on the alternate key map, each of said symbolic identifiers provides information relating to the assignment of a key of the groups of keys of the two-way mobile communication device.

14. A method as recited in claim 13, wherein the key map is a navigation key map, and the alternative key map is an alternative navigation key map.

15. A method as recited in claim 9, wherein said displaying of the key map comprises:

identifying a plurality of applications resident in the two-way mobile communication device;

producing the key map, the key map providing graphical indicators for at least the set of the resident applications; and displaying of the key map on the display of the two-way mobile communication device.

16. A two-way mobile communication device, comprising:

a display screen;

an input user interface that allows a user to input a selection, said input user interface including keys;

a processor for executing at least one of a plurality of resident application programs; and a memory that stores the resident application programs, said memory further stores program code to enable a user to facilitate easy user selection of one of the resident application programs to activate, said program code including:

program code for displaying a key map on said display of the two-way mobile communication device, the key map including symbolic identifiers for a group of the resident application programs, and each of the symbolic identifiers are assigned to a key of a group of keys of the two-way mobile communication device and are arranged in a configuration corresponding to the group of keys of the two-way mobile communication device;

program code for receiving a selection of the keys in the group of keys; and program code for activating one of the resident application programs within the group of the resident application programs that is associated with the selected one of the keys in the group of keys, wherein the keys in the group of keys are navigation keys for the two-way mobile communication device are arranged in a circular pattern, and wherein the arrangement of the symbolic identifiers is circular with a like configuration as the navigation keys in the circular pattern, and wherein at least two of the resident application programs within the group of resident application programs are chosen from the group of: email application, address book application, notepad application, and network browser application.

17. A device as recited in claim 16, wherein said symbolic identifiers are selected from a group consisting of bitmaps, JPEG images and GIF images.

18. A device as recited in claim 16, wherein the arrangement of the symbolic identifiers within the key map corresponds to an arrangement of the keys in the group of keys.

* * * * *